United States Patent Office 3,606,959
Patented Sept. 21, 1971

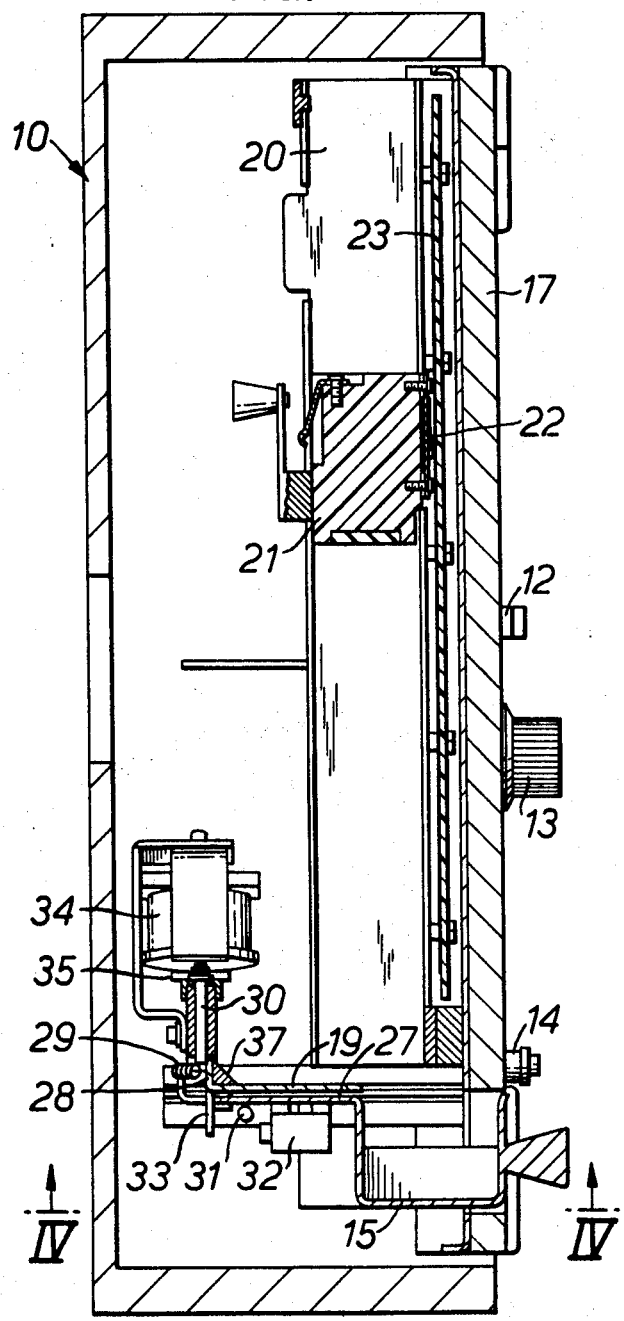

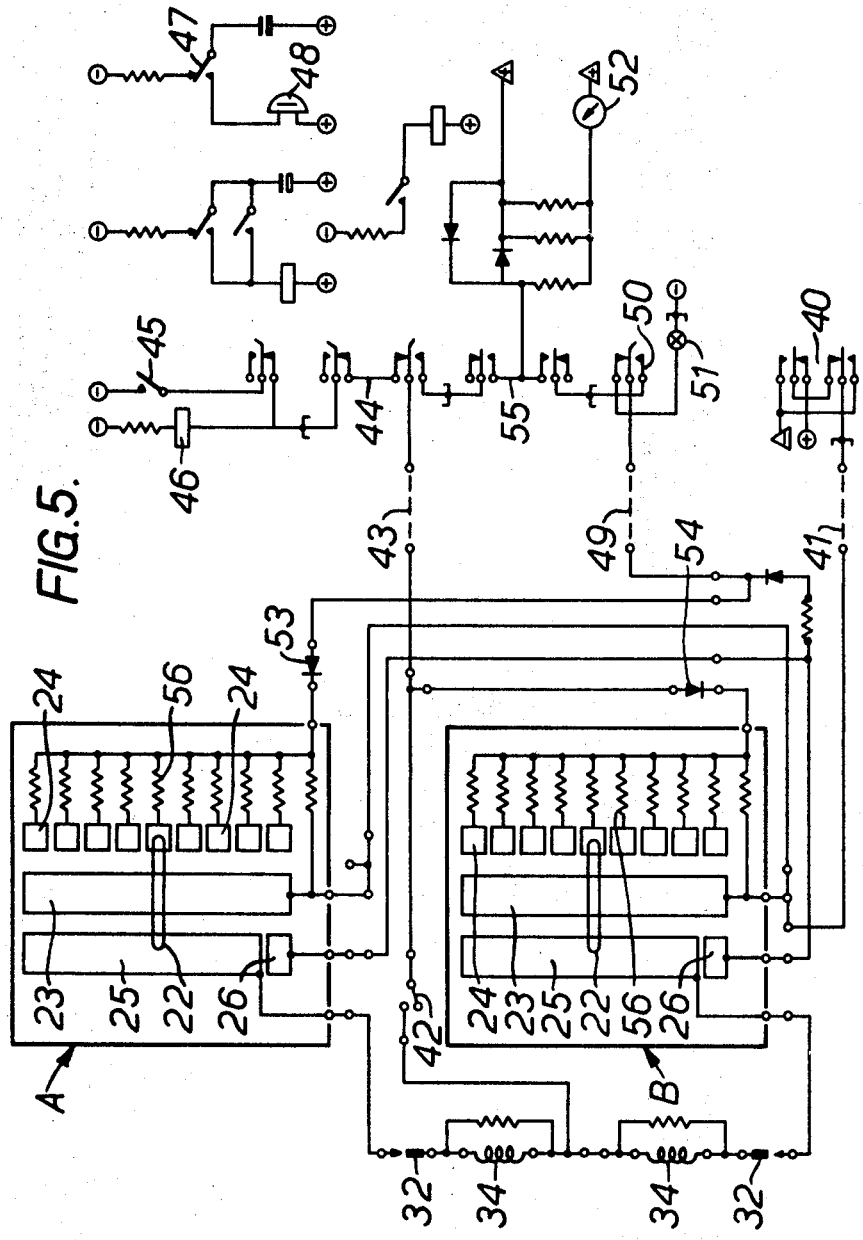

3,606,959
DISPENSING MACHINE WITH REMOTE
CONDITION INDICATOR
Charles Richard Paul Stonor, Haywards Heath, England, assignor to Sound Diffusion (Sales) Limited, Sussex, England
Filed Dec. 12, 1968, Ser. No. 783,217
Claims priority, application Great Britain, Dec. 21, 1967, 58,117/67
Int. Cl. G07f *11/00*
U.S. Cl. 221—2                                    16 Claims

ABSTRACT OF THE DISCLOSURE

A centralised system for automatic goods-dispensing machines for use in hotel rooms etc. with means including a sliding switch for reading off the contents of each machine on a central meter and means for locking any machine from a central location.

---

The invention relates to a dispensing machine for dispensing unit articles from a store and especially to drawer-operated dispensing machines and has an object to provide a means for indicating remotely the number of articles in the store.

According to the invention there is provided a dispensing machine for the dispensing of unit articles including means for holding a store of unit articles in a line, means for dispensing the article at one end of the line and means for providing an electrical signal in accordance with the length of the line and transmitting it to an indicator to indicate the number of articles in the store.

A plurality of such machines may be located at various sites, for instance in hotel rooms, with the electrical signal from each machine being led to a central indicator or display.

A dispensing machine embodying the invention will be described with reference to the accompanying drawings in which:

FIG. 3 is a section along the line III—III in FIG. 2;

FIG. 5 is an electrical circuit diagram for the dispensing machine.

Figure 1:
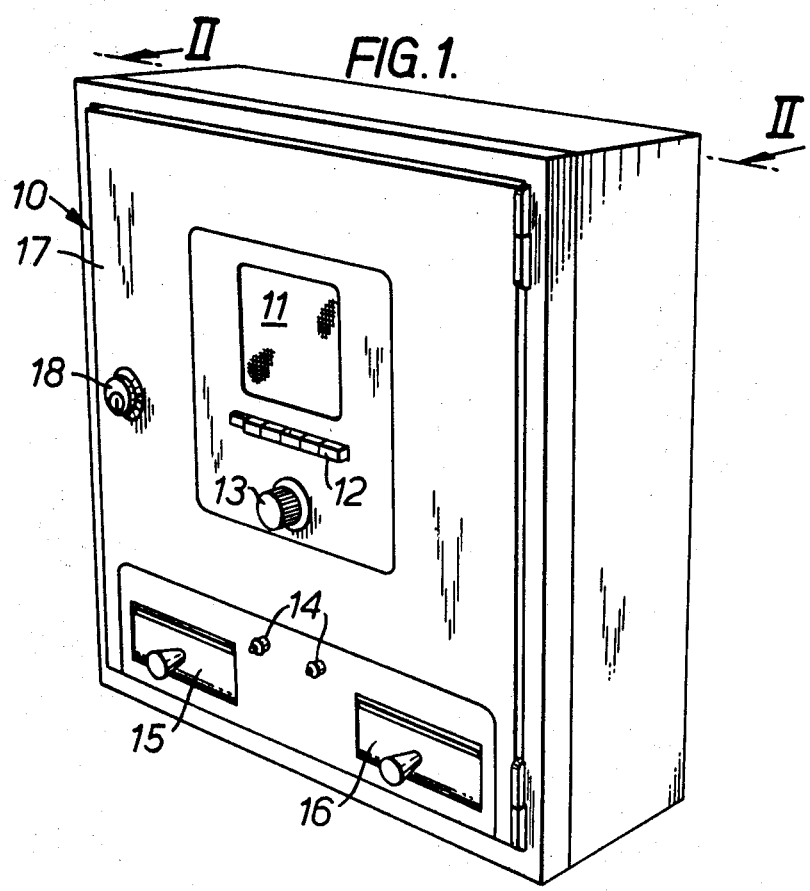
FIG. 1 is a perspective view of a cabinet incorporating a dispensing machine and an outlet of a hotel communications system.

The cabinet 10 illustrated in FIG. 1 of the drawings is adapted for mounting as a bedside cabinet in hotel rooms or in like places and includes an outlet of a hotel communications system. To this end the cabinet includes a loudspeaker 11 for providing one of a number of radio programmes relayed from a central station (not shown) or a two way communication with the Reception, selected by buttons 12 under the control of an amplifying knob 13. The cabinet also includes fire-detection electrodes 14 of a well-known type. A drawer 15, 16 is located on each side of the front panel of the cabinet for the withdrawal of unit articles from a vertical stack or store. Typically the articles in each store may be packaged capsules of whiskey and gin respectively. The front panel 17 of the cabinet is mounted on hinges to provide access to the interior, for replenishing the stores and servicing, on operation of a lock 18. As will be described the drawers are normally empty and freely operable and to obtain service they are pressed inwards until an article falls into the drawer, after which the drawer is opened.

In order to control the use of the dispensing machine, particularly when the articles contained are alcoholic and their distribution may be governed by licensing laws, a stop may be provided to prevent the release of the articles into the drawer, or to prevent the drawer being opened. This stop may be releasable by a key inserted in the cabinet by the room occupant, so that the distribution of keys could be controlled. Alternatively the stop could be releasable by the operation of a key or keys at a remote position, such as manually at the hotel reception desk or by a time-switch, where licensing laws restrict the distribution of alcoholic drinks to certain hours.

In the embodiment illustrated the stop means comprises a slide 19 controlling the release of articles into the drawer and is itself controlled from a remote point such as the hotel reception desk as hereinafter described.

Figure 2:
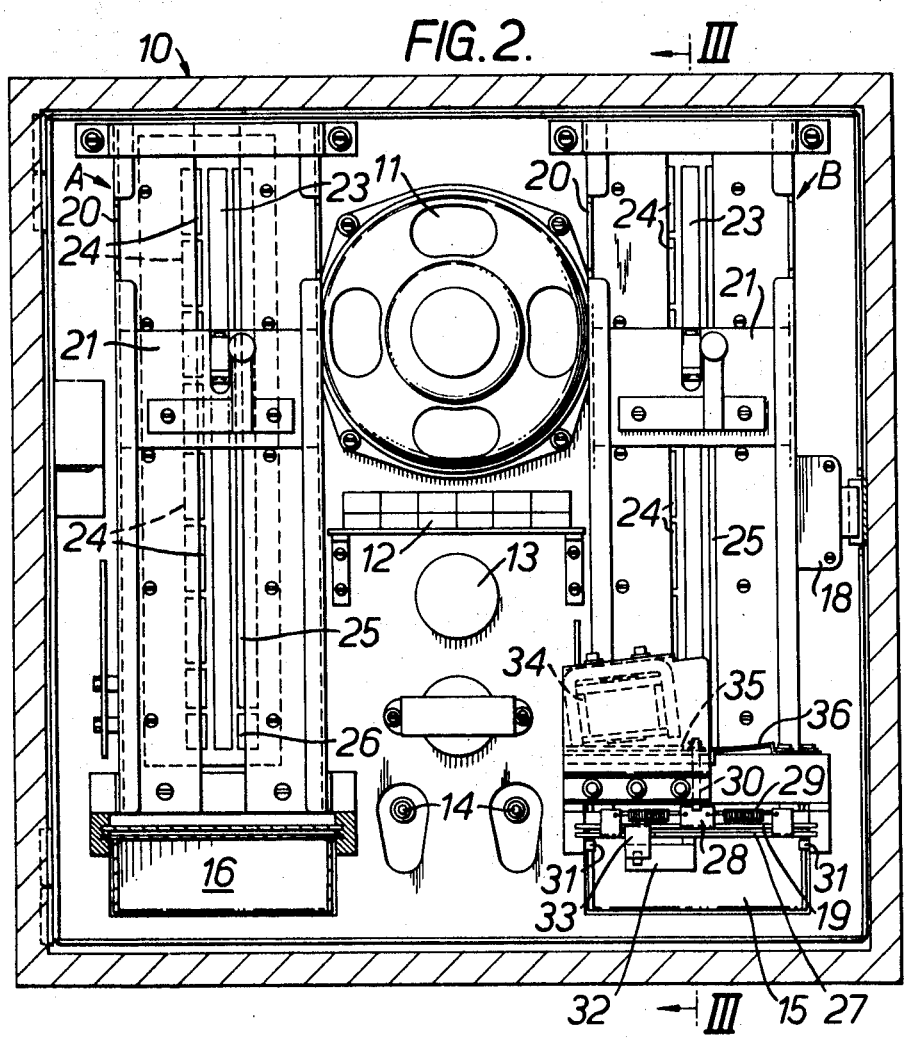
FIG. 2 is a rear view of the cabinet shown in FIG. 1 with the back panel and the electrical connections removed.

As shown in FIGS. 2 and 3 a holder for a stack of eight articles of unit size is provided above each drawer by a sheet metal frame 20. The stacks are denoted as A and B. A PVC bar 21 in which a sliding contact 22 is embedded rests on the top article of each stack. The sliding contact is in continuous contact with a fixed central contact strip 23 and connects this strip 23 to one of a row of contacts 24 (on the left side of the drawer as seen in FIG. 2) according to the number of articles in the stack to connect the appropriate resistance into a circuit and thus indicate at the reception desk the number of articles in the stack in the manner to be described. The sliding contact 22 also connects the central strip 23 to an adjacent continuous strip 25, except in its lowest position when it contacts a separate contact 26. Engagement of the sliding contact 22 with the continuous strip 25 enables articles to be released into the drawer and engagement with the separate contact 26 indicates at the reception desk that the stack is empty.

Figure 4:
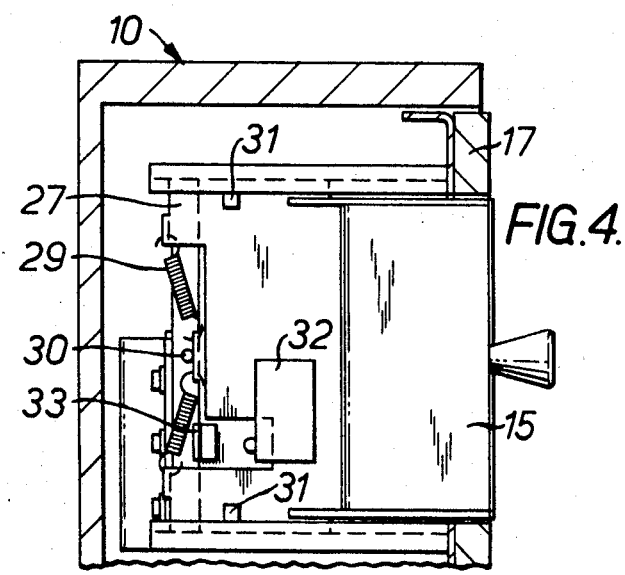
FIG. 4 is a section along the line IV—IV in FIG. 3.

As shown in FIGS. 3 and 4, a ledge 27 extends backwards from the rear rim of the drawer beneath the slide 19 and is linked to an up-turned flange 28 of the slide by springs 29. Normally the drawer is partly in front of the frame 20. On insertion of the drawer the slide is drawn back through the springs 29 against a pin 30 contacting the up-turned flange 28. In this position the slide still prevents the release of articles into the drawer. As the drawer moves directly beneath the stack of articles and into engagement with a stop 31 a microswitch 32 carried beneath the ledge 27 engages, and is closed by a down-turned flange 33 on the slide 19. The closure of the microswitch completes a circuit to energise a solenoid 34 which withdraws the pin 30 by excitation of a bar 35 through which the pin passes. On withdrawal of the pin the slide is drawn back by the springs 29 releasing an article into the drawer and also breaking the microswitch circuit so ensuring that the energising current is only momentary. When the solenoid is de-energised the pin 30 is returned by a leaf spring 36. It will be seen that by opening the microswitch circuit at some other point, e.g. the hotel reception desk, the energisation of the solenoid and release of articles into the drawer is inhibited.

When the drawer is subsequently opened to remove the article in it the pin 30 rides over the up-turned flange 28 by way of a sloping surface 37.

FIG. 5 shows the principal parts of an electrical circuit for the supervision and metering of the dispensing machine. The left hand side of the figure shows the circuit of the machine and the right hand side the remote circuit at the reception desk.

The circled points (⊕, ⊖) indicate the terminals of a D.C. power supply at, say, 55 v. obtained by rectification of a mains supply. As shown in FIG. 5, the positive side of this supply is normally connected to each sliding contact 22 through a switch 40, a cable 41, the central contact strip 23. As long as there are articles in the stack, and the sliding contact is not in its lowest position, the return circuit includes the respective microswitch 32 and solenoid 34, a common local lock 42 in the dispensing machine, a common cable 43, a selection switch 44 at the reception desk, a remote lock 45 and a relay 46.

When the locks 42 and 45 are closed and the switches 40 and 44 are set for normal operation, the closure of one of the microswitches 32 by insertion of the respective drawer completes the appropriate circuit to energise the solenoid 34 and allow an article to be released into a drawer.

The circuit can be disconnected in either of the following ways to prevent withdrawal of articles (particularly if these are alcoholic drinks) from the machine.

(i) The local lock 42 which is in the machine cabinet may be opened with a key only in the possession of hotel staff or only given to selected room occupants.

(ii) The remote lock 45 may be opened at the reception desk if it is desired to prevent a room occupant using the machine or if the machine is to be inoperative at certain times, in which case the lock, or an additional lock, may be controlled by a time switch.

Due to the action of the springs 29 the current through the solenoid is of momentary duration so that the solenoid does not have to be designed to withstand high currents for long periods. Whenever the operating circuit closes the relay 46 closes a switch 47 to ring a bell 48.

When the last article has been released from either of the stacks, the sliding contact connects the supply through a contact 26, a cable 49, a contact of switch 50 to a lamp 51 at the reception desk.

METERING

At the reception desk there is a central meter 52 which is used to display the contents of each stack of each machine in turn. This is done when a room occupant leaves or on refilling the machine.

For this purpose a stabilised D.C. power source

is connected across the same cables as are used for the operating supply. The negative terminal is connected through cable 41 to the sliding contact 22. The return circuit for stack A is through the series of contacts 24 a diode 53 and cable 49 to switch 50. The return circuit for stack B is through the series of contacts 24 a diode 54 and cable 43 to switch 44.

The cable 41 is common to all the machines in the system, the cables 43 and 49 are separate for each machine and the machine to be metered is selected by the switch 40. The side of the machine is then selected by a switch 55 which can connect either cable 43 or cable 49 to the meter 52.

Each of the row of contacts 24 has a unique resistance 56 which determines the current passed to the meter and hence the meter reading. Preferably the resistances should be arranged so that, if the sliding contact sticks between contacts the meter reading is off the scale. To this end the meter should, of course, have a false zero. Suitable resistance values are (from the top of a stack) $2.3k$, $2.5k$, $2.8k$, $3.4k$, $4.8k$, $6.4k$, $9.5k$, $18k$, $20k$.

Whilst one embodiment of the invention has been particularly described variations may be introduced into several features of the machine and circuitry. For instance, the sliding contact and rows of contacts may be replaced by a moving magnet co-operating with a series of fixed reed relays. Similarly the slide and pin could be replaced by a solenoid-operated catch controlling the opening or insertion of the drawer.

The cables 43 and 49 can be shared with the communication or fire detection circuits leading to the dispensing machine.

I claim:

1. A dispensing machine for the dispensing of unit articles including means for holding a store of unit articles in a line, means for dispensing the articles from one end of the line and means responsive to the length of the line of articles remaining in said store for providing an electrical signal of a character in accordance with the length of the line and transmitting said signal to an indicator to directly indicate the number of articles remaining in the store including switch means comprising a part moving with the end of the line furthest from the dispensing end and co-operating with parts of the switch means adjacent the line to introduce electrical elements into an indicating circuit to provide an electrical signal dependent upon the position of the moving part and hence on the length of the line, and an indicator connected to be responsive to said signal.

2. A dispensing machine as recited in claim 1, wherein said line of stored articles is a vertical stack below which is disposed a movable drawer, and means controlled by movement of said drawer is provided for dispensing an article from the bottom of the stack into said drawer.

3. A dispensing machine as defined in claim 2, wherein a solenoid operated catch controls movement of said drawer.

4. A dispensing means as defined in claim 1, wherein said signal is provided by means that is movable in accord with the position of the last article in the line.

5. A centralized system including a central station linked to a plurality of the dispensing machines claimed in claim 1, by an electrical cable which carries the signal transmitted from each station to a common indicator at the central station.

6. A centralized system as claimed in claim 5, wherein said plurality of dispensing machines are selectively connected by a selection switch to a common meter to indicate the number of articles remaining in each line.

7. A centralized system as claimed in claim 5 including a central switch for disconnecting a selected one or all of said dispensing machines.

8. A centralized system as recited in claim 5 wherein said article dispensing means for each dispensing machine includes a supply circuit having a solenoid to which current is fed along the same cable as is used for transmitting the said signal, and said circuit includes a central switch for selecting the supply and transmitting circuits.

9. A centralized system as recited in claim 8, wherein each machine has two lines of articles, the signal indicating the length of one line of articles being transmitted along the line used to supply the solenoid of the machine.

10. A centralized system as defined in claim 9, including another circuit for each machine for indicating when the line of articles is empty, the signal indicating the length of the other line of articles being transmitted by said other circuit.

11. A dispensing machine for the dispensing of unit articles including means for holding a store of unit articles in a line, means for dispensing the articles from one end of the line and means responsive to the length of the line of articles remaining in said store for providing an electrical signal of a character in accordance with the length of the line and transmitting said signal to an indicator to directly indicate the number of articles remaining in the store, said line of stored articles being a vertical stack below which is disposed a movable drawer, and means comprising a solenoid operated stop controlled by movement of said drawer provided for dispensing an article from the bottom of the stack into said drawer.

12. A dispensing machine as defined in claim 11 wherein the solenoid is operably contained in a circuit that includes a switch actuated by movement of said drawer.

13. A dispensing machine as defined in claim 12, said circuit including a further switch for selectively disabling the solenoid.

14. A dispensing machine for the dispensing of unit articles including means for holding a store of unit articles in a vertical column, means for dispensing the articles comprising a movably mounted drawer beneath the bottom of the column, means for releasing the bottom article of the column into the drawer, a circuit containing a solenoid operably connected to said releasing means and a switch that is closed to energize the solenoid to release the bottom article into the drawer upon insertion of the drawer into the machine, and means for providing an electrical signal in accordance with the length of the column and transmitting it to an indicator to indicate the number of articles remaining in the store.

15. A centralized system as defined in claim 14 including means for indicating when a line of articles is empty.

16. A dispensing machine for the dispensing of unit articles including means for holding a store of unit articles in a line, means for dispensing the articles from one end of the line, means responsive to the length of the line of articles remaining in said store for providing an electrical signal of a character in accordance with the length of the line and transmitting said signal to an indicator to directly indicate the number of articles remaining in the store, wherein a sliding electrical contact is mounted to follow the article furthest from the dispensing end of the line, the sliding contact co-operating with one of a line of fixed electrical contacts adjacent to, and with the same spacing, as the line of articles to connect a unique value of resistance indicative of the sliding contact position into the sliding contact circuit to provide an electrical signal dependent upon the number of articles in the line, and an indicator connected to be responsive to said signal.

References Cited
UNITED STATES PATENTS

| | | | |
|---|---|---|---|
| 1,699,868 | 1/1929 | Anderson | 221—2X |
| 2,323,681 | 7/1943 | Sangster et al. | 221—152X |
| 2,604,531 | 7/1952 | Osborne et al. | 221—7 |
| 3,310,198 | 3/1967 | Regan et al. | 221—7 |
| 2,291,187 | 7/1942 | Johnson | 221—256X |
| 2,840,147 | 6/1958 | Almestad | 222—51X |

SAMUEL F. COLEMAN, Primary Examiner

U.S. Cl. X.R.

221—152, 256